(12) United States Patent
Balsells et al.

(10) Patent No.: US 7,858,892 B2
(45) Date of Patent: *Dec. 28, 2010

(54) BALL HOLDING, LATCHING AND LOCKING APPLICATIONS USING RADIAL AND AXIAL SPRINGS BY INCORPORATING ELECTRICAL CONDUCTIVITY AND ELECTRICAL SWITCHINGS

(75) Inventors: Peter J. Balsells, Newport Beach, CA (US); Majid Ghasiri, Mission Viejo, CA (US)

(73) Assignee: Bal Seal Engineering Co., Ltd., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/613,478

(22) Filed: Nov. 5, 2009

(65) Prior Publication Data

US 2010/0051438 A1 Mar. 4, 2010

Related U.S. Application Data

(63) Continuation-in-part of application No. 11/869,929, filed on Oct. 10, 2007, now Pat. No. 7,838,787, which is a continuation-in-part of application No. 11/278,372, filed on Mar. 31, 2006, now abandoned.

(60) Provisional application No. 60/668,309, filed on Apr. 5, 2005.

(51) Int. Cl.
*H01H 19/46* (2006.01)

(52) U.S. Cl. .................................. 200/519; 200/277
(58) Field of Classification Search ................ 285/261, 285/263, 268, 269, 318; 403/122–144, 357, 403/326; 267/166; 464/106; 200/43.01–43.07, 200/51 R, 51.07, 51.09, 52 R, 61.11, 61.58 R, 200/61.64, 61.67, 519, 537–541; 439/6–11, 439/13, 17, 19, 110, 117; 362/421, 227, 362/287, 427, 404, 394

See application file for complete search history.

(56) References Cited

U.S. PATENT DOCUMENTS 7,538,289 B2 * 5/2009 Carroll ..................... 200/519

\* cited by examiner

*Primary Examiner*—Michael A Friedhofer
(74) *Attorney, Agent, or Firm*—Walter A. Hackler

(57) ABSTRACT

A latching and electrical switch mechanism includes an insulated housing having a cavity therein with an opening thereto along with an electrically conductive ball disposed therein. The ball includes a stem with a smaller diameter than the ball and extends therefrom with a ball being sized for rotational and translational movement within the housing cavity. At least one groove is provided in the housing cavity and a coil spring is disposed in a groove for making electrical contact with the ball and retaining the ball for rotation within the cavity with the stem at selected conical angles with respect to the housing centerline. At least one electrical contact is disposed in the cavity at a spaced apart relationship with the coil spring for providing electrical connection with the ball upon translational movement of the ball within the cavity, which also produces an audible sound.

12 Claims, 8 Drawing Sheets

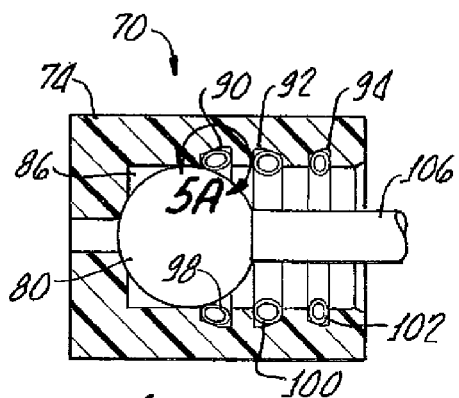
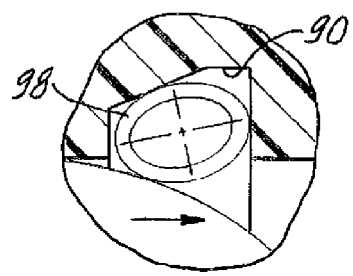
FIG. 5.   FIG. 5A.
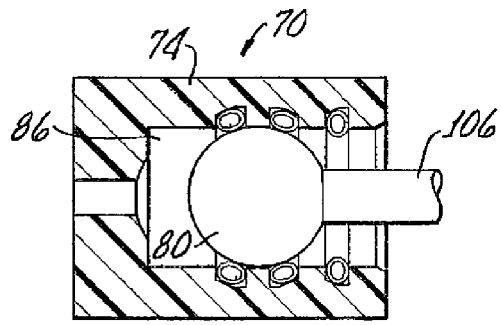
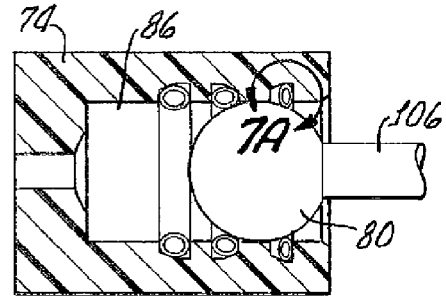
FIG. 6.   FIG. 7.
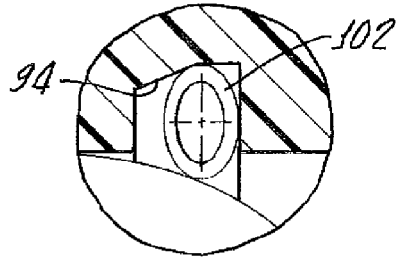
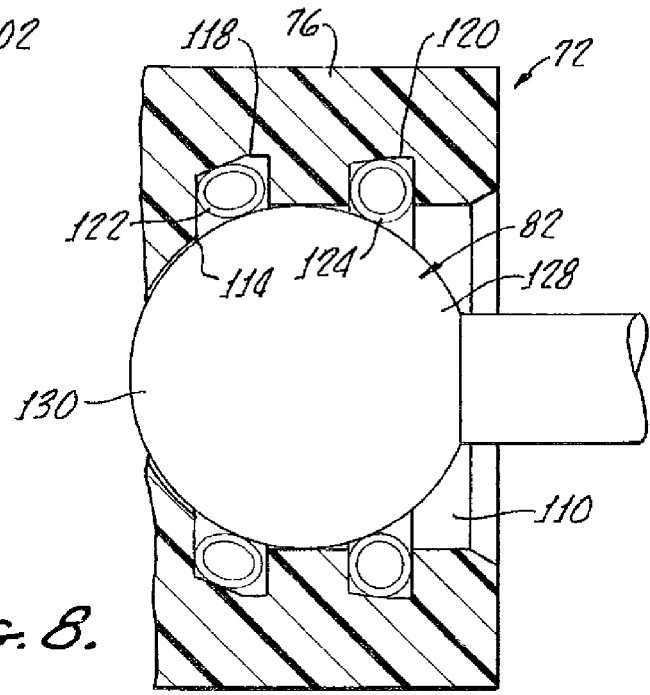
FIG. 7A.   FIG. 8.

BALL HOLDING, LATCHING AND LOCKING APPLICATIONS USING RADIAL AND AXIAL SPRINGS BY INCORPORATING ELECTRICAL CONDUCTIVITY AND ELECTRICAL SWITCHINGS

The present application is a continuation-in-part of U.S. Ser. No. 11/869,929 filed Oct. 10, 2007 now U.S. Pat. No. 7,838,787 which is a continuation-in-part of U.S. Ser. No. 11/278,372, filed Mar. 31, 2006 now abandoned, which claims priority from the U.S. Provisional Patent Application Ser. No. 60/668,309 filed Apr. 5, 2005. These applications are to be incorporated herein in their entirety including all specification and drawings.

The present invention generally relates to combining ball holding, latching, and locking applications using radial and axial springs and further combining a spherical end stem into a single electrical conductor that provides rotational, longitudinal, swivel, conical motion and switching with electrical conductivity.

Canted coil springs have been used extensively and latching applications primarily in connectors that require longitudinal and rotating movement. The present application furthers the use of canted coil springs by their utilization in a latching mechanism having a ball and socket arrangement.

Connectors used in holding applications have been described extensively, as for example, U.S. Pat. Nos. 4,974, 821, 5,139,276, 5,082,390, 5,545,842, 5,411,348 to Balsells, and others. All of these patents are to be incorporated herewith by this specific references thereto.

Of these cited U.S. Pat. No. 4,974,821 generally describes canted coil springs and a groove for orienting the spring for major axis radial loading for enabling a specific preselected characteristic in response to loading of the spring.

U.S. Pat. No. 5,082,390 teaches a canted coil spring for holding and locking a first and second number to one another.

U.S. Pat. No. 5,139,276 discloses a radially loaded spring in a groove for controlling resilient characteristics of the spring.

U.S. Pat. Nos. 5,411,348 and 5,545,842 teach spring mechanisms which preferentially lock two members together.

Heretofore, U.S. Pat. No. 7,175,441 B2 teaches spherical as well as longitudinal movement while conducting current in different positions. However, this is achieved by a 2-step component; one consisting of longitudinal motion and the other one with spherical motion. In the present invention, both of these steps are combined with a single component.

SUMMARY OF THE INVENTION

A latching mechanism in accordance with one embodiment of the present invention generally includes a housing having a cavity therein with an opening thereto. A ball, sized for insertion into a housing cavity through the opening, includes a stem having a smaller diameter than the ball from which it extends. The ball sizing also enables production of an audible source upon insertion of the ball into the cavity.

At least one groove in the housing cavity is provided proximate the cavity opening and a coil spring is disposed in the groove which retains the ball for rotation from the cavity with the stem at selected conical angles with respect to a housing centerline.

In the groove may be circumferential and the coil spring is a continuous garter type spring, or a plurality of arcuate grooves may be provided in the housing cavity and arcuate coil spring segments are disposed in each of the arcuate grooves.

A plurality of spaced apart circumferential grooves may be utilized in the housing cavity with a continuous garter coil spring disposed in each of the grooves which enables positioning the ball at different lateral positions within the housing.

The groove and the spring may be configured for locking the ball within the housing cavity and still another embodiment of the present invention the cavity is spherical. In this embodiment, two grooves may be disposed in the housing cavity with coil springs therein with the grooves being disposed on opposite hemispheres of the ball.

In another embodiment, the ball may be electrically conductive and the coil springs are disposed in the groove for making electrical contact with the ball while enabling ball rotation within the cavity with the stem at selected conical angles with respect to a housing centerline. And at least one electrical contact is disposed in the cavity at a spaced apart relationship with the coil spring for providing electrical connection with the ball upon translation movement of the ball within the cavity, the translational movement producing an audible sound.

A plurality of spaced apart circumferential grooves may be provided in the housing cavity with corresponding coil springs disposed in each of the plurality of grooves and positioned for enabling sequential electrical connection with the ball in order to provide multiple parallel and serial electrical switching by translational movement of the ball within the cavity, the translational movement producing an audible sound.

More particularly, two or three circumferential grooves may be disposed in the housing with corresponding coil springs disposed therein for enabling sequential electrical connection. Further, a circumferential groove may be provided for removably engaging each of the springs.

BRIEF DESCRIPTION OF THE DRAWINGS

The advantages and features of the present invention will be better understood with the following description when considered in conjunction with the accompanying drawings, of which:

FIG. 5 illustrates yet another embodiment of the present invention utilizing a plurality of springs and grooves;

FIG. 5A illustrates a specific groove and a coil spring configuration for enabling of movement in a lateral direction within the housing cavity;

FIG. 6 illustrates the ball being positioned between the two of the grooves and springs;

FIG. 7 illustrates yet another position of the ball within the cavity;

FIG. 7A illustrates a groove and spring configuration for locking the ball within the cavity to prevent removal therefrom;

FIG. 8 is a cross sectional view of yet another embodiment of the present invention utilizing two grooves and coil springs along with a cavity having a spherical shaped portion;

DETAILED DESCRIPTION

Figure 1:
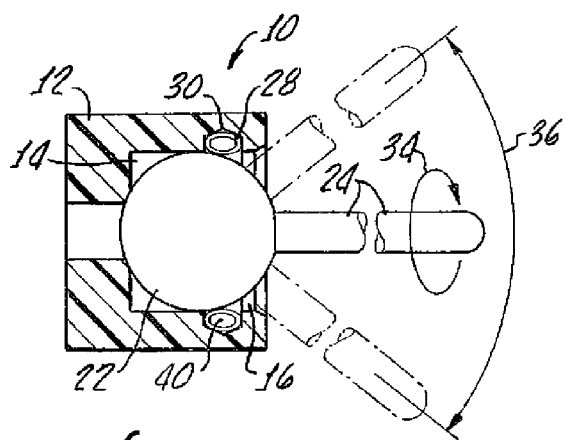
FIG. 1 is a side view of a mechanism in accordance with the present invention, in partial cross section, generally showing a housing and a cavity therein with an opening thereto along the ball inserted therein having a stem extending therefrom along with a groove in the housing cavity proximate the cavity opening the coil spring disposed in the groove for retaining the ball for rotation and conical movement within the cavity.

With reference to FIG. 1, there is shown a latching mechanism 10 in accordance with the present invention generally including a housing 12 having a cavity 14 therein with an opening 16. A ball 22 having a stem 24 extending therefrom is disposed within the cavity 14 with the ball 22 being sized for insertion into the housing cavity 14 through the opening 16 as illustrated. A radial canted coil spring 28 is disposed in a v-groove 30 for retaining the ball 22 for rotation within the cavity 14 with the stem at selected conical angles illustrated by the arrows 34, 36 in FIG. 1. Suitable springs and grooves for providing specific pre-selected characteristics are described in the hereinabove referenced U.S. patents which are incorporated herewith by reference.

Briefly, the spring 28 is retained in the cavity 14 and a radial force is applied along a minor axis 40 onto the coil spring 28. The spring 28 is initially retained in the cavity by a spring OD larger than the ID of the cavity 14 thus creating a force that retains the spring within the cavity 14. The groove width (GW) is larger than the coil width (GW) of the spring (GW>CW). This type of design generates a ratio of connect to disconnect at approximately 1 to 1. The spring 28 also contributes to the production of an audible sound when the ball 22 is inserted into the cavity 14 and forced into an abutting retention with the housing 12. Other configurations considered part of the present invention are described in the hereinabove referenced U.S. patents.

The force required to insert and disconnect the ball 22 from the housing 12 is affected by the contact angle with the greater the contact angle the lower the force required to connect or disconnect. Such contact angle is determined by the groove configuration.

Figure 2:
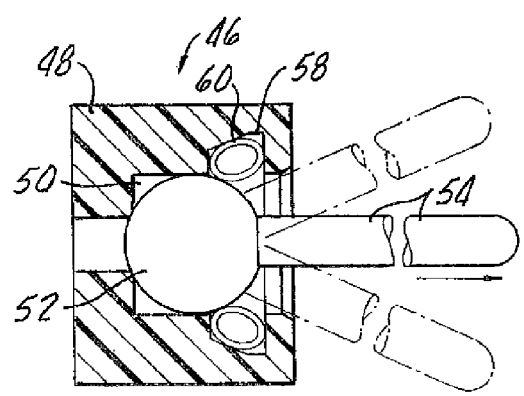
FIG. 2 is a view similar to FIG. 1 of an embodiment of the present invention utilizing a different groove configuration and also illustrating the decoupling of the ball from the housing cavity.

With reference to FIG. 2, alternative embodiment 46 includes a housing 48 with cavity 50 with a ball 52 inserted thereinto with an extending stem 54 utilizing a different groove 58 configuration which includes a tapered bottom. The groove width at the bottom is smaller than the groove coil width illustrating another method in which the spring 60 can be retained in the groove 58 and cavity 50 with the forces to insert and disconnect being variable requiring more force to connect and to disconnect and due to the geometry of the groove and spring assembly. Again, further detach of spring are groove configuration may be found in the incorporated U.S. patents.

Figure 3:
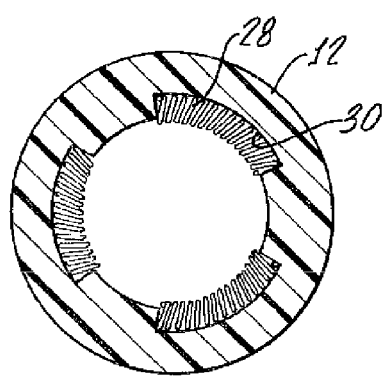
FIG. 3 is a cross sectional view of the present invention illustrating one embodiment of the present invention in which arcuate grooves and arcuate coil spring segments are utilized.
Figure 4:
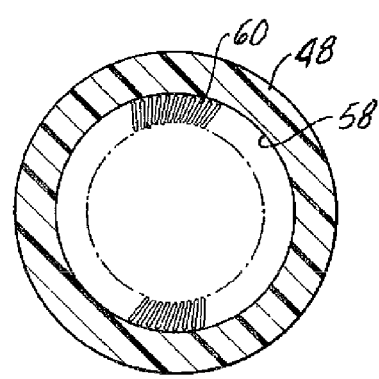
FIG. 4 is a cross sectional view of another embodiment of the present invention illustrating the use of a continuous circumferential groove and continuous garter type coil spring.

As illustrated in FIGS. 3 and 4, a coil spring 28 may comprise an arc segment and correspondingly the groove 30 is also an arc segment whereas, as shown in FIG. 4, the coil spring 60 may be continuous with the groove 58 also being circumferential and continuous within the cavity 50.

The materials of construction for the embodiment 10, 46, as well as 70, illustrated in FIGS. 5, 6, and 7 and embodiment 72 shown in FIG. 8 include housings 12, 48, 74, and 76 formed of a suitable rigid material such as metal, or the like, with the same being true for the balls 22, 52, and 80, 82.

With specific reference to FIGS. 5, 6, and 7, the housing 74 includes a cavity 86 including three spaced apart grooves for supporting springs 98, 100, 102, thus enabling the lateral positioning of the ball 80 within the cavity 86, as illustrated progressively in FIGS. 5, 6, and 7. Various spring and groove configurations may be utilized to control the connect and disconnect forces. As illustrated by an arrow in FIG. 5a, the groove 90 and spring configuration enables passage of the ball 80 thereby along with the stem for disconnect, whereas the groove 94 and spring configuration 102 shown in FIG. 7a lock the ball 80 to prevent disconnect from the housing cavity 86.

The embodiment 72 shown in FIG. 8 utilizes a cavity 110 having a spherical inside shape 114 and further includes two grooves 118, 120 with springs 122, 124 therein to provide greater retaining force on the ball 82 with the groove 118 and spring 122, then groove 120 and spring 122 being disposed on opposite or opposing hemispheres 128, 130 of the ball 82, disconnect being indicated by an arrow.

Figure 9:
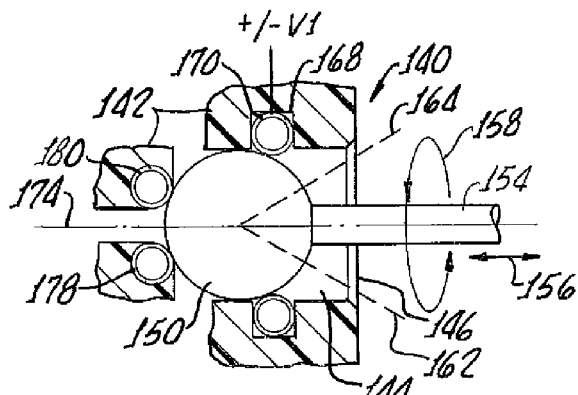
FIGS. 9-21A are mechanical and electrical schematics showing a variety of positions and applications that may be derived with a series of contact springs in a rotational, longitudinal and swivel as well as conical movement with contact springs of different designs and mounting means while achieving multiple positioning and switching functions. These circuits are able to switch one or more polarity of electrical energy by mechanical contact movement. Both series and parallel connections as well as different voltage can be switched using these circuits. The electrical energies switched can be AC, DC, high voltage, low voltage, high frequency, low frequency, analog and digital signals.

With reference to FIGS. 9-21A there is shown mechanical and electrical schematics corresponding to the structure shown in cross section in FIGS. 1-8. With reference to FIG. 9, there is shown a latching and electrical switch mechanism 140 which includes an insulated housing 142 including a cavity 144 with an opening 146 thereto. An electrically conductive ball 150 includes a conductive stem 154 with a smaller diameter than the ball 150 and extends therefrom through the opening 146. As indicated by the arrows 156, 158 the ball is movable within the cavity 144 in both translational and rotational directions. Dashed lines 162, 164 illustrate conical freedom of movement of the stem 154 while the ball 150 is disposed in the cavity 144.

The insulated housing 142 may be made from any suitable material and the ball 150 with stem 154 may also be made from any suitable conductive material.

As hereinbefore discussed in connection with the mechanism 10, a groove 168 in the cavity 144 supports a coil spring which in the mechanism 140 is electrically conductive and provides for making electrical contact with the ball 150 while retaining the ball 150 for rotation within the cavity 144 with the stem 154 at selected conical angles with respect to the housing centerline 174. Electrical contact 178 is provided and disposed in the cavity 144 and supported by the insulated housing 142 in a spaced apart relationship with the coil spring 170 for providing electrical connection with the ball 150 upon translational movement of the ball 150 within the cavity 144 as indicated by the arrow 156, electrical contact being established in the position shown in FIG. 9. The electrical contact 178 can be in one or more segments, such as depicted in FIG. 3 and FIG. 4.

This provides for a single circuit with one position with adjustment and multiple directions of the ball 150.

Figure 9A:
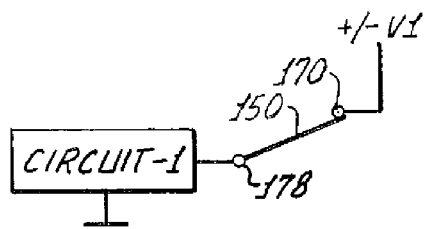

An electrical schematic of this mechanism is illustrated in FIG. 9a with the line 150 representing the conductive ball 150.

It should be appreciated that the mechanism 140 provides a combination of a holding latching and locking device while at the same time providing electrical conductivity through the canted coil spring 170 and ball 150 along with contact 178. Electrical continuity is maintained despite the rotation and swivel motion of the stem 154 provided by the structure of the present invention. As hereinafter discussed in greater detail in connection with FIGS. 10-21A the present invention provides for multiple spherical positioning with longitudinal rotational and swivel motion with multiple plurality in series in parallel connections either AC or DC with high or low voltage with high and low frequency with both analog and digital signals. Switching between positions is both continuous and smooth while providing various electrical signals.

Figure 10:
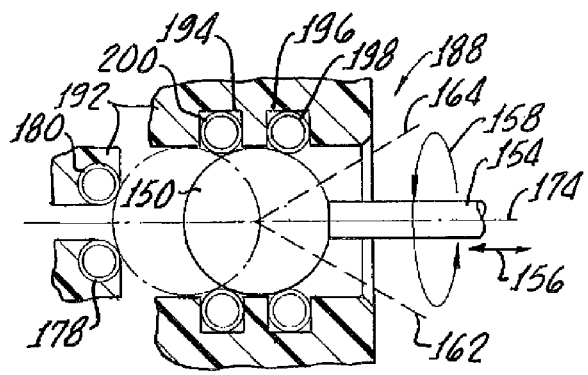
Figure 10A:
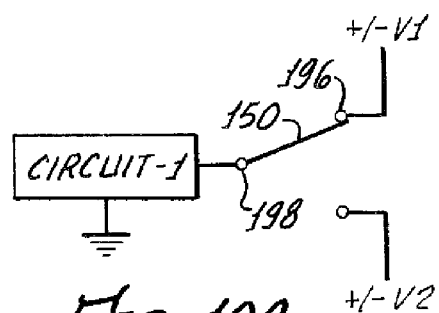

In that regard, FIGS. 10 and 10A provides for a mechanism 188 in which identical or substantially similar elements are indicated by the same character references as hereinabove described in connection with FIGS. 9 and 9A. Also, in that regard, all of the FIGS. 10 through 21A include common reference characters for identical or substantially similar components. Accordingly, these components will not be hereinafter described to avoid duplication.

The mechanical circuit of FIG. 10 illustrates a single circuit with two positions with adjustment in multiple directions. A housing 192 includes two grooves 194, 196 with conductive springs 198, 200 disposed therein respectively. An electrical schematic of the mechanical arrangement shown in FIG. 10 is shown in FIG. 10A.

Figure 11:
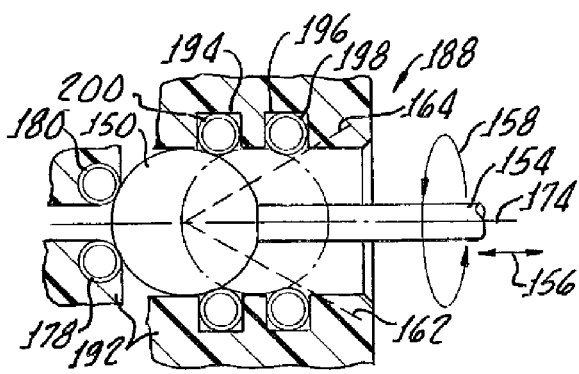
Figure 11A:
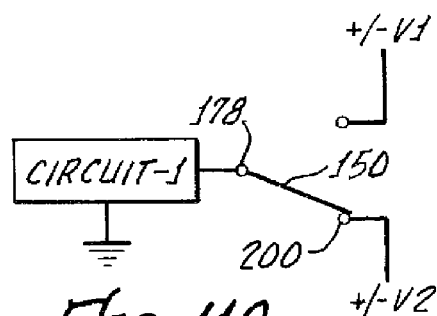

FIG. 11 shows another position of the ball 150 illustrating completion of the circuit between the springs 200 and contact 178 as electrically schematically illustrated in FIG. 11A.

Figure 12:
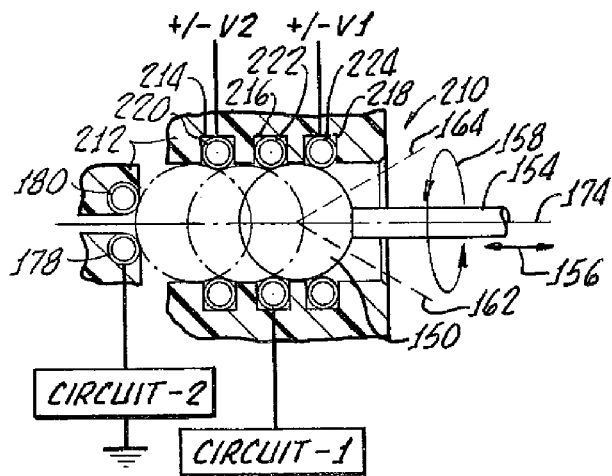
Figure 12A:
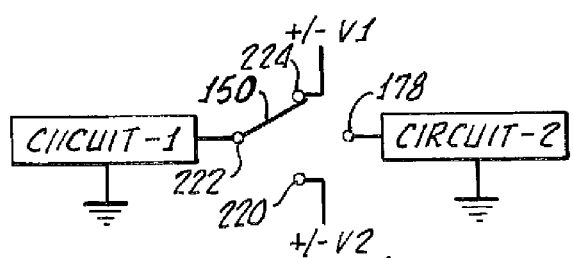
Figure 13:
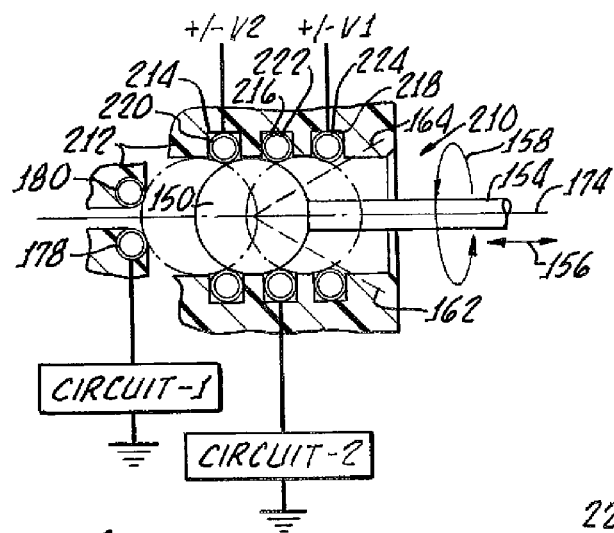
Figure 13A:
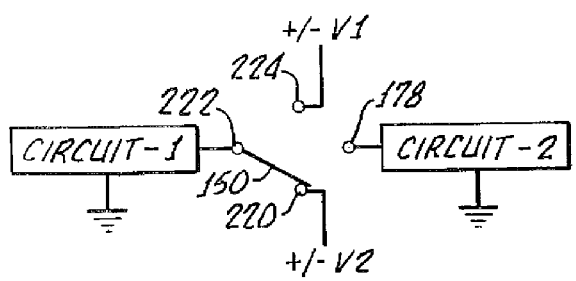
Figure 14:
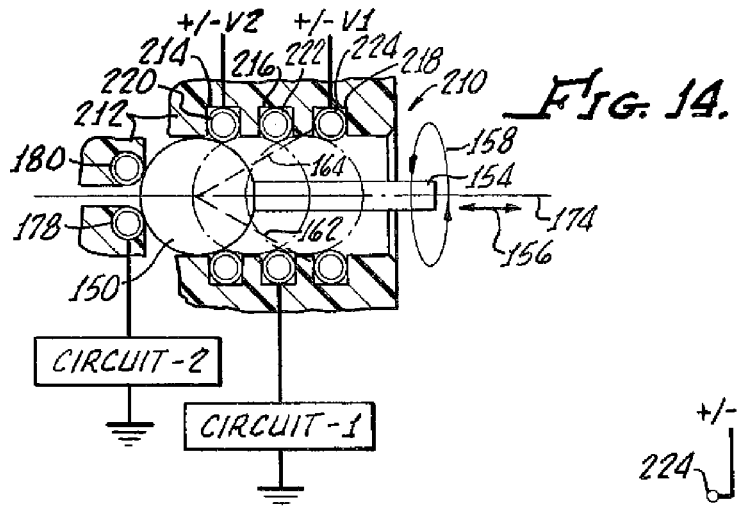
Figure 14A:
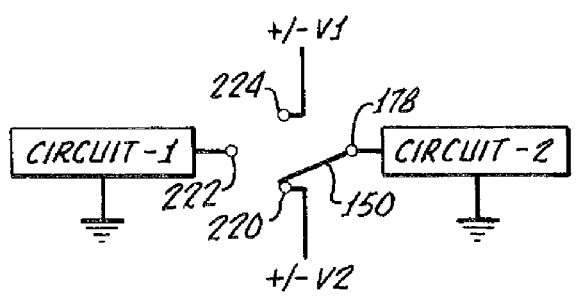

With reference to FIGS. 12-14A, there is shown a switch mechanism 210 providing a single circuit with three positions with adjustment in multiple directions utilizing a housing 212 with three grooves 214, 216, 218 with corresponding springs 220, 222, 224 disposed therein. Electrical connection corresponding to the positions of the ball 150 are illustrated respectively in FIGS. 12A, 13A, and 14A.

FIGS. 15-17A illustrate switching mechanism 228 illustrate a parallel switching mechanism 228 which includes a ball contact spring housing mounted dual circuit with three positions with adjustment in multiple directions.

Figure 15:
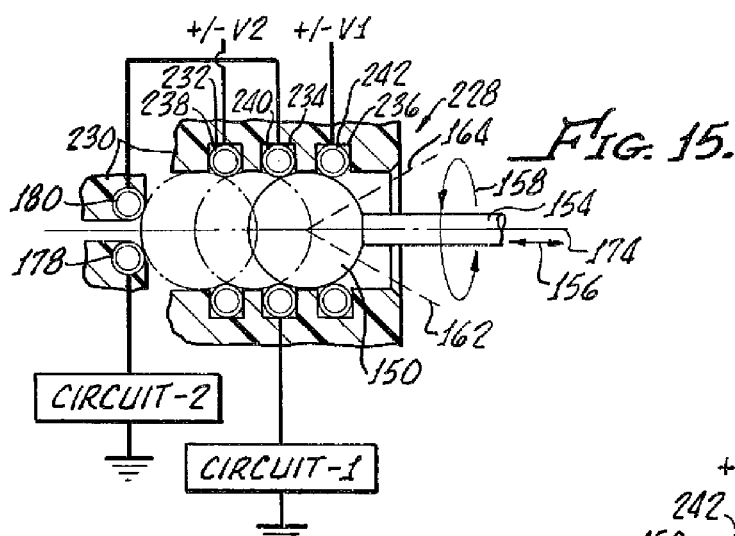
Figure 15A:
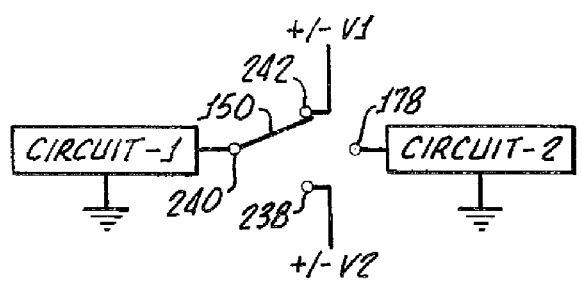
Figure 16:
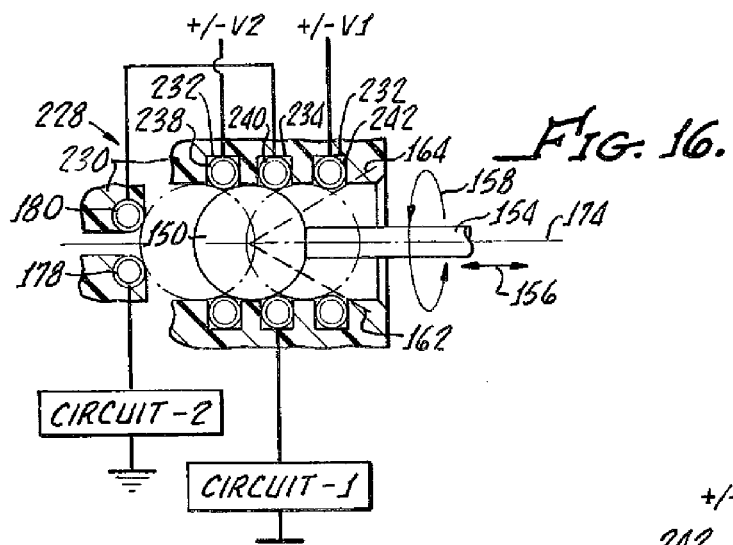
Figure 16A:
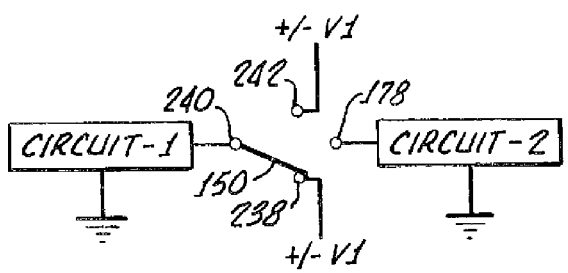
Figure 17:
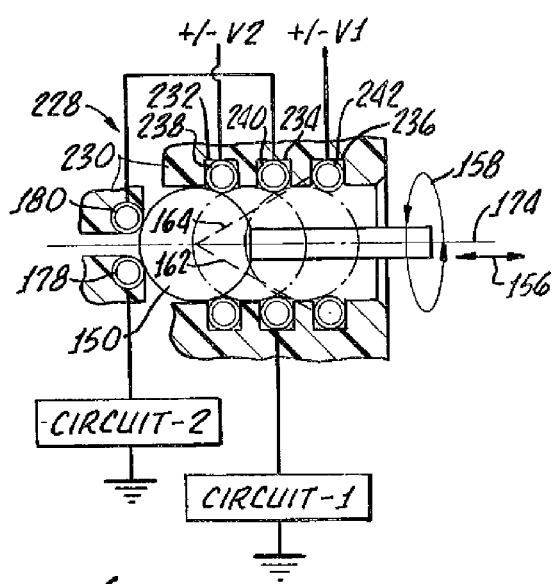
Figure 17A:
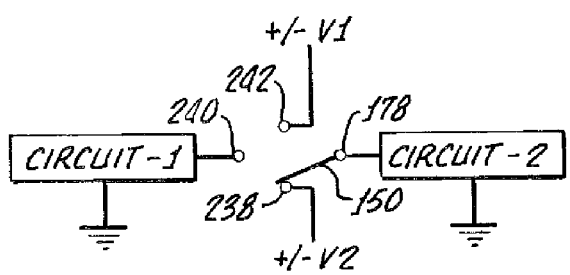
Figure 18:
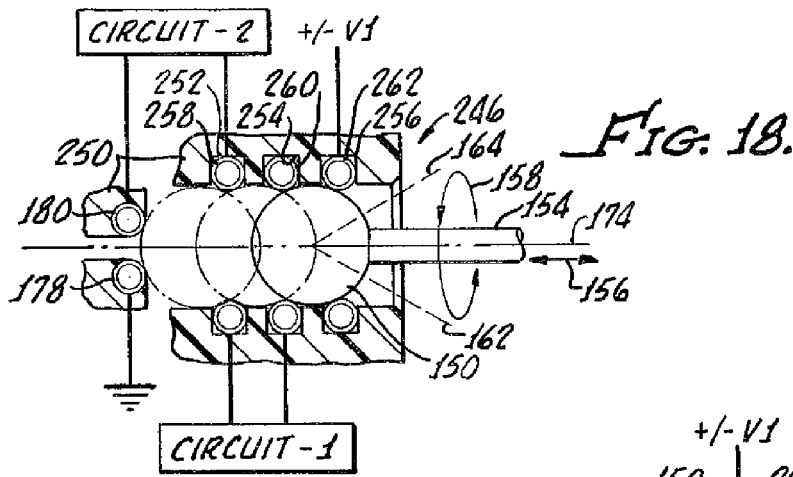
Figure 18A:
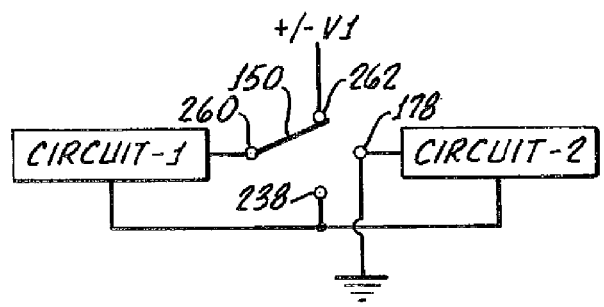
Figure 19:
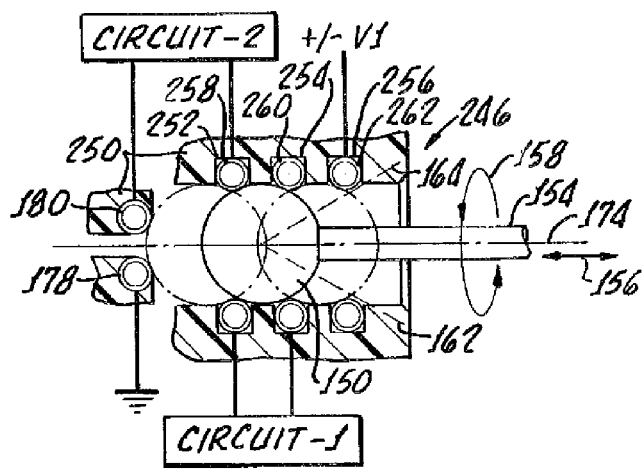
Figure 19A:
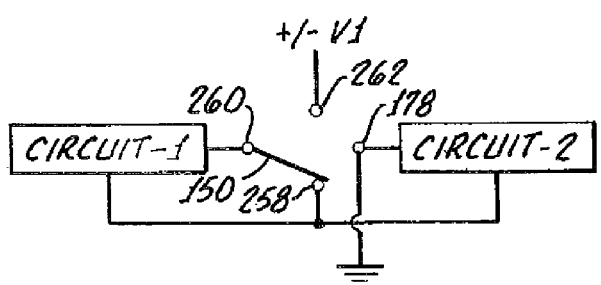
Figure 20:
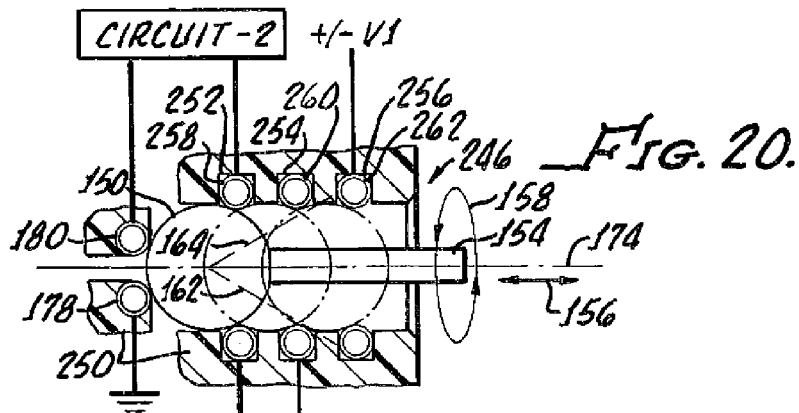
Figure 20A:
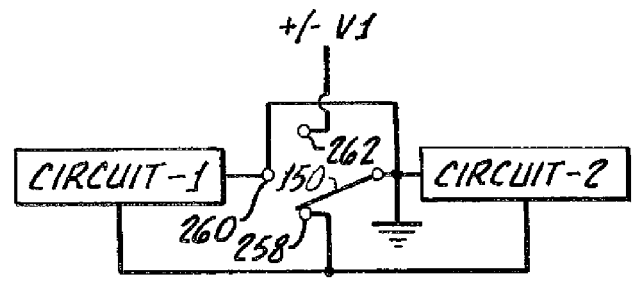

This mechanism 228 includes a housing 230 including three grooves 232, 234, 236 with corresponding springs 238, 240, 242 disposed therein. Corresponding electrical schematics are illustrated in FIGS. 15A, 16A and 17A. There is an electrical connection established by conductive wire 243, which electrically connects spring 178 and 240.

With reference to FIGS. 18-20A there is shown a switching mechanism which provides for mechanical circuit ball in series. A ball contact spring housing 250 bounce a dual circuit with three positions with adjustment in multiple directions. Three grooves 252, 254, 256 with springs 258, 260, 262 are provided. An audible sound is produced when the ball 150 is transitionally moved between positions due to engagement by different springs.

Figure 21:
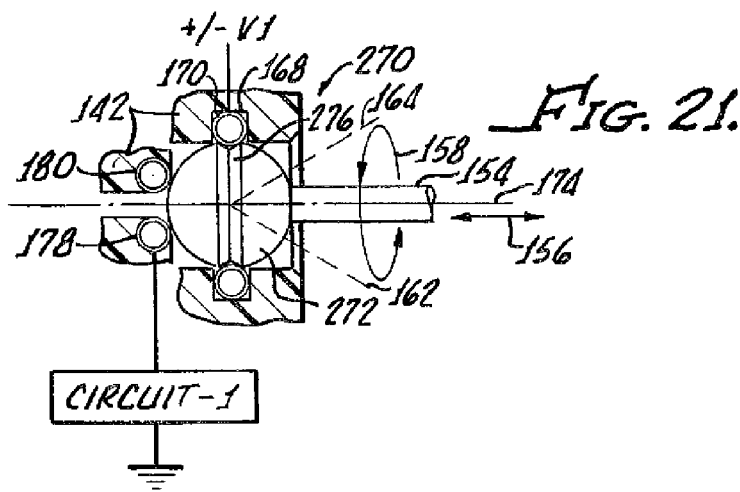
Figure 21A:
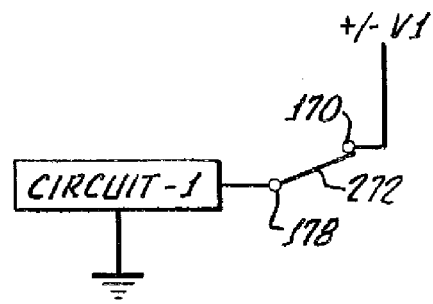

Yet another mechanism 270 is illustrated in FIG. 21. This mechanism 270 is similar to the mechanism 140 illustrated in FIG. 9 with common reference character representing identical or substantially similar components. In this embodiment, a ball 272 includes a groove 276 for receiving the spring 170 in order to further control the connect and disconnect forces of the mechanism 270.

Although there has been hereinabove described a specific ball holding, latching, and locking applications using radial and axial springs by incorporating electrical conductivity and electrical switches in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A latching and electrical switch mechanism comprising:
an insulated housing having a cavity therein with an opening thereto;
an electrically conductive ball having a stem of smaller diameter than the ball and extending therefrom, the ball being sized for rotational and translational movement within the housing cavity and producing an audible sound upon insertion of the ball into the cavity:
at least one groove in the housing cavity;
a coil spring, disposed in the groove, for making electrical contact with the ball and retaining the ball for rotation within cavity with said stem at selected conical angles with respect to a housing centerline; and
at least one electrical contact disposed in said cavity at a spaced apart relationship with said coil spring, for providing electrical connection with the ball upon translational movement of the ball within said cavity.

2. The mechanism according to claim 1 wherein said groove is circumferential and said coil spring is a continuous garter type spring.

3. The mechanism according to claim 1 wherein a plurality of arcuate grooves are disposed in the housing cavity and an arcuate coil spring segment is disposed in each of the arcuate grooves.

4. The mechanism according to claim 1 further comprising a plurality of spaced apart circumferential grooves in the housing cavity and a corresponding coil spring disposed in each of the plurality of the grooves and positioned for enabling sequential electrical connection with the ball in order to provide multiple parallel and serial electrical switching by translational movement of the ball within said cavity.

5. The mechanism according to claim 1 further comprising two spaced apart circumferential grooves in the housing cavity and a corresponding coil spring disposed in each of the grooves and positioned for enabling sequential electrical connection with the ball in order to provide multiple parallel and serial electrical switching by translational movement of the ball within said cavity, each transitional movement producing an audible sound.

6. The mechanism according to claim 1 further comprising three spaced apart circumferential grooves in the housing cavity and a corresponding coil spring disposed in each of the grooves and positioned for enabling sequential electrical connection with the ball in order to provide multiple parallel and serial electrical switching by translational movement of the ball within said cavity, each transitional movement producing an audible sound.

7. A latching and electrical switch mechanism comprising;
an insulated housing having a cavity therein with an opening thereto;

an electrically conductive ball having a stem of smaller diameter than the ball and extending therefrom, the ball being sized for insertion into the housing cavity and disconnection from the housing cavity through said opening and providing an audible sound upon insertion of the ball into the cavity;

at least one groove in the housing cavity proximate the cavity opening;

a coil spring, disposed in the groove for making electrical contact with the ball and enabling ball rotation within said cavity with said stem at selected conical angles with respect to a housing centerline, said coil spring having a contact angle with the ball determined by a groove configuration in order to control ball insertion and ball disconnect forces; and at least one electrical contact disposed in said cavity at a spaced apart relationship with said coil spring, for providing electrical connection with the ball upon translational movement of the ball with said cavity.

8. The mechanism according to claim 7 wherein said groove is circumferential and said coil spring is a continuous spring.

9. The mechanism according to claim 7 wherein a plurality of arcuate grooves are disposed in the housing cavity and an arcuate coil spring segment is disposed in each of the arcuate grooves.

10. The mechanism according to claim 7 further comprising a plurality of spaced apart circumferential grooves in the housing cavity and a corresponding coil spring disposed in each of the plurality of the grooves and positioned for enabling sequential electrical connection with the ball in order to provide multiple parallel and serial electrical switching by translational movement of the ball within said cavity.

11. The mechanism according to claim 7 further comprising two spaced apart circumferential grooves in the housing cavity and a corresponding coil spring disposed in each of the grooves and positioned for enabling sequential electrical connection with the ball in order to provide multiple parallel and serial electrical switching by translational movement of the ball within said cavity, each transitional movement producing an audible sound.

12. The mechanism according to claim 7 further comprising three spaced apart circumferential grooves in the housing cavity and a corresponding coil spring disposed in each of the grooves and positioned for enabling sequential electrical connection with the ball in order to provide multiple parallel and serial electrical switching by translational movement of the ball within said cavity, each transitional movement producing an audible sound.

* * * * *